United States Patent [19]

Wilson

[11] 4,036,255
[45] July 19, 1977

[54] VAPOR RECOVERY ADAPTER

[75] Inventor: Fred A. Wilson, Florence, Ky.

[73] Assignee: Dover Corporation, New York, N.Y.

[21] Appl. No.: 614,708

[22] Filed: Sept. 18, 1975

[51] Int. Cl.² .................. F16K 11/14; F16K 1/14
[52] U.S. Cl. .................. 137/587; 137/625.49;
                                                137/202
[58] Field of Search .............. 137/597, 588, 587, 202,
            137/267, 266, 625.49; 220/85 VR, 85 VS

[56] References Cited

U.S. PATENT DOCUMENTS

| 3,736,950 | 6/1973 | Smallwood | 137/202 |
| 3,771,566 | 11/1973 | McMath et al. | 137/625.49 |

Primary Examiner—William R. Cline
Attorney, Agent, or Firm—John G. Schenk

[57] ABSTRACT

A vapor recovery adapter has a housing supported on a storage tank having a volatile liquid therein. The housing is connected to other tanks, which also are vented by the adapter in addition to the tank on which the housing is mounted, through an inlet port perpendicular to an inlet port communicating with the tank on which the housing is mounted. Diametrically disposed to the inlet port to the other tanks is a first outlet port through which all of the tanks are vented when not being filled and through which any of the tanks can receive air when liquid is being withdrawn therefrom. The first outlet port is blocked by slidable valve means in the housing when any tank is to be filled and a second outlet port at the top of the housing is opened to allow the vapor to be vented from any tank being filled to a truck tank from which the tank is being filled so that there is no exhaust of vapor to the atmosphere.

9 Claims, 3 Drawing Figures

VAPOR RECOVERY ADAPTER

BACKGROUND OF THE INVENTION

1. Description of Prior Art

In U.S. Pat. No. 3,771,566 to McMath et al, there is shown a vapor recovery adapter for preventing vapor escape to the atomosphere when a storage tank is being filled while allowing escape of vapor at all other times and permitting air from the atomosphere to be drawn into the tank when liquid is being withdrawn therefrom. While the vapor recovery adapter of the aforesaid McMath et al patent has been capable of handling a plurality of tanks connected thereto, it has required a single common line from the tanks to be connected to the vapor recovery adapter. Thus, the vapor recovery adapter of the aforesaid McMath et al patent has not been capable of mounting on a tank. When utilized with more than one tank, it has required fittings for each of the tanks and then a single connection to the vapor recovery adapter.

In U.S. Pat. No. 3,736,950 to Smallwood, there is shown an anti-contamination vent valve for preventing escape of liquid from a tank being filled into the vent line to prevent contamination of the vent line or other tanks connected to the same vent line. Thus, the anti-contamination vent valve of the aforesaid Smallwood patent prevents liquid from a tank being filled from overflowing into the vent line to contaminate the vent line or other tanks connected thereto while still enabling venting of the tank at all other times and allowing air to be drawn into the tank when liquid is being removed from the tank.

Accordingly, when it has been desired to utilize the anti-contamination vent valve of the aforesaid Smallwood patent with each of a plurality of tanks and to also employ the vapor recovery adapter of the aforesaid McMath et al patent, it has been necessary to have one more manhole and the connected fittings than the number of tanks with which the vapor recovery adapter of the aforesaid McMath et al patent and the anti-contimination vent valve of the aforesaid Smallwood patent are employed. This is because each of the anti-contamination vent valves requires a manhole for its installation and the vapor recovery adapter of the aforesaid McMath et al patent also requires a manhole for its installation.

2. Field of the Invention

The present invention is an improvement of the vapor recovery adapter of the aforesaid McMath et al patent in that it enables the use of the anti-contamination vent valve of the aforesaid Smallwood patent with each of the tanks without requiring a greater number of manholes than the number of tanks. That is, if there are two tanks, then the use of the improved vapor recovery adapter of the present invention results in only two manholes being required even though each tank has one of the anti-contamination vent valves of the aforesaid Smallwood patent.

The present invention accomplishes the foregoing through mounting the vapor recovery adapter directly on one of the tanks and have the anti-contamination vent valve of the aforesaid Smallwood patent supported thereby. At the same time, a vent line connected to each of the connected tanks, which have only the anti-contamination vent valve of the aforesaid Smallwood patent, can also be connected to the improved vapor recovery adapter of the present invention. Thus, the remainder of the tanks have manhole only for the anti-contamination vent valve of the aforesaid Smallwood patent. Therefore, the total number of manholes is equal to the number of tanks being vented.

An object of this invention is to provide an improved vapor recovery adapter.

Other objects, uses, and advantages of this invention are apparatus upon a reading of this description, which proceeds with reference to the drawings forming part thereof and wherein:

DESCRIPTION OF THE PREFERRED EMBODIMENTS

Figure 1:
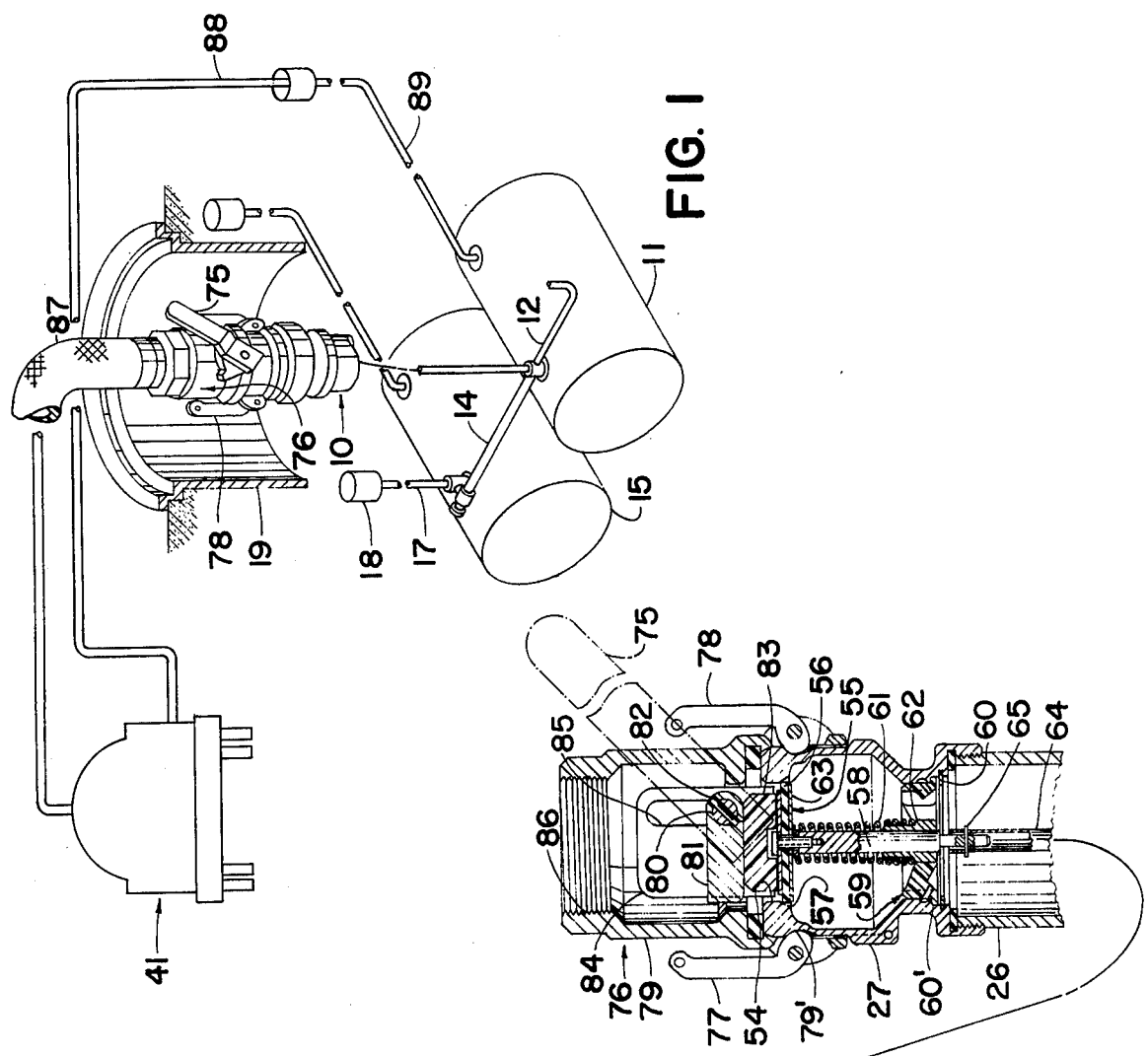
FIG. 1 is a schematic perspective view showing the improved vapor recovery adapter of the present invention connected to a plurality of underground storage tanks and having the tanks being filled from a tank truck.
Figure 2:
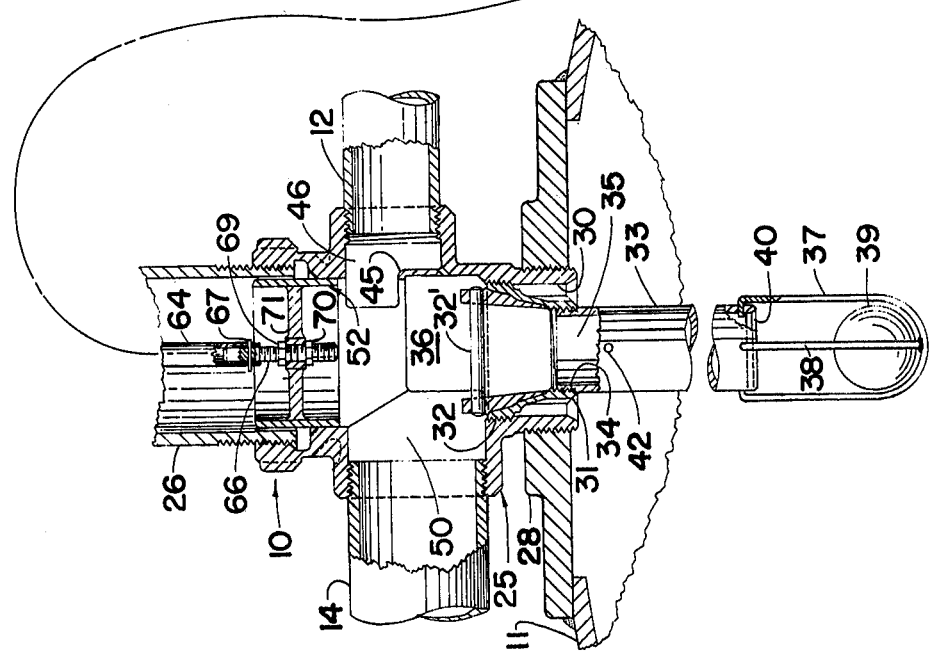
FIG. 2 is a sectional view of the improved vapor recovery adapter of the present invention including an anti-contamination vent valve secured thereto and showing the adapter mounted on the tank with no tank being filled.

Referring to the drawings and particularly FIGS. 1 and 2, there is shown a vapor recovery adapter 10 of the present invention mounted on an underground storage tank 11 in which a volatile liquid such as gasoline, for example, is stored. The vapor recovery adapter 10 has a line 12 connected thereto and leading to the atomsphere through the ground.

The adapter 10 also has a line 14 connected to an underground storage tank 15 in which a volatile liquid such as gasoline, for example, is stored. The line 14 is connected to the tank 15 through an anti-contamination vent valve (not shown) of the type shown and described in the aforesaid Smallwood patent. In addition to being connected to the line 14 the vent valve is connected to a pipe 17, which extends upwardly to just below the ground surface level and terminates within a manhole 18. The manhole 18 is generally imbedded in the pavement surface at ground level.

The vapor recovery adapter 10 also is readily accessible from the ground level through a manhole 19. The manhole 19 is generally imbedded in the pavement surface at ground level.

While only the tank 15 has been shown in addition to the tank 11, it should be understood that any numbers of tanks like the tank 15 could be connected to the line 14. Each of these tanks would have one of the anti-contamination vent valves of the type shown and described in the aforesaid Smallwood patent, the pipe 17, and the manhole 18 in the same manner as the tank 15.

The vapor recovery adapter 10 includes a housing, which comprises a main body 25 (see FIG. 2), a pipe 26, and an upper body or fitting 27. The main or lower body 25 is threadedly connected to the lower end of the pipe 26 while the upper body 27 is threadedly connected to the upper end of the pipe 26.

The vapor recovery adapter 10 is secured to the tank 11 through the main body 25 being threadedly mounted in a nut 28 or the like, which is secured to the storage tank 11 by suitable means such as welding, for example.

Thus, the vapor recovery adapter 10 is fixed to the tank 11 and extends upwardly therefrom.

The main body 25 has a first inlet port 30 at its lower end communicating with the interior of the tank 11. A cage 31 is supported within the first inlet port 30 in the main body 25 by cooperating threads 32 on the cage 31 and the main body 25.

It should be understood that the cage 31 has a handle 32' secured to its upper end. The handle 32' facilitates the turning of the cage 31 during its insertion or removal from the main body 25.

An anti-contamination vent valve for use with the vapor recovery adapter 10 includes a nipple 33, which is secured to the lower end of the cage 31 by cooperating threads 34 on the cage 31 and the nipple 33. The nipple 33 is hollow to provide a passage 35 therethrough from the interior of the tank 11 into the first inlet port 30 and then to a chamber 36 within the main body 25.

The anti-contamination vent valve also includes a pair of U-shaped members 37 and 38, which may be wires, for example, secured to the lower end of the nipple 33 and extending downwardly therefrom into the tank 11. The members 37 and 38 provide a substantially open cage within which is disposed a spherical float or ball 39. As more particularly shown and described in the aforesaid Smallwood patent, the ball 39 rises as the level of the fluid in the tank 11 rises. When the ball 39 reaches its uppermost extent of travel as shown in the phantom line position in FIG. 3, the ball 39 engages a valve seat 40 in the lower end of the nipple 33 to prevent fluid from passing through the first inlet port 30 in the main body 25 to the chamber 36 therein.

When the ball 39 engages the seat 40, the air and/or vapor trapped within the tank 11 and above the level of the liquid in the tank 11 becomes further compressed. This increased pressure of the air and/or vapor increases the pressure within the tank 11 sufficiently to prevent further flow of liquid into the tank 11.

This is recognized by the operator filling the tank 11 from a gasoline tank truck 41 (see FIG. 1), for example. As a result, the operator stops supply of liquid to the tank 11.

The nipple 33 has a bleed opening 42 therein above the seat 40. Thus, the bleed opening 42 enables some bleeding of the pressure within the tank 11 to the chamber 36 even when the ball 39 is engaging the seat 40.

When the tank 11 is not being filled, the ball 39 does not engage the seat 40 so that vapor can escape from the tank 11 to the atmosphere through the first inlet port 30 in the main body 25 to the chamber 36 therein from which it flows through an aperture 45 in the main body 25 and a first outlet port 46 to the line 12. As previously mentioned, the line 12 extends above ground to vent vapor to the atmosphere. Similarly, the anti-contamination vent valve which is the type shown and described in the aforesaid Smallwood patent, in the tank 15 enables vapor in the tank 15 to flow therefrom to the line 14 from which it flows through a second inlet port 50 which is larger than the first outlet port 46 and diametrically disposed thereto, in the main body 25 to the chamber 36 in the main body 25.

From the chamber 36, the vapor flows through the aperture 45 and the first outlet port 46 to the vent line 12. Thus, vapor from the tank 11, the tank 15, and any other tank connected to the line 14 is exhausted to the atmosphere through the line 12.

When gasoline is being pumped from the tank 11, for example, air is sucked into the tank 11 from the atmosphere through the vent line 12, the first outlet port 46, the aperture 45, the chamber 36, and the first inlet port 30 in the main body 25. This is necessary to avoid a vacuum in the tank 11.

Similarly, when gasoline is pumped from the tank 15, for example, air is drawn into the tank 15 through the line 14, the second inlet port 50 in the main body 25, the chamber 36, the aperture 45, the first outlet port 46 in the main body 25, and the line 12. Any other tank connected to the line 14 would similarly draw air from the atmosphere when the gasoline therein is being withdrawn.

Whenever gasoline is to be supplied to the tank 11, the tank 15, or any other tank connected to the line 14, it is desired to be able to recover the vapor from the tank being filled and return it to the tank truck 41, for example, from which gasoline, for example, is supplied to the tank 11, the tank 15, and any other tank connected to the line 14. Accordingly, the aperture 45 is blocked by a sliding piston 52. When the piston 52 is moved to the position of FIG. 3 in which it blocks the aperture 45, a second outlet port 54 in the top of the upper body 27 is opened through causing a poppet valve 55 to have a sealing disc 56, which is formed of synthetic rubber, for example, moved downwardly away from a valve seat 57 in the upper portion of the upper body 27.

The poppet valve 55 includes a stem 58, which is slidably mounted in a bridge guide 59. The bridge guide 59 is secured within the body 27 by a retaining ring 60 and a shoulder 60' of the bridge guide 59 acting against a counterbore in the body 27. A spring 61, which has one end acting against a shoulder 62 of the bridge guide 59 and its other end acting against a plate 63 of the poppet valve 55, continuously urges the popet valve 55 to its closed position of FIG. 2 to block the second outlet port 54.

The lower end of the stem 58 of the poppet valve 55 has the upper end of a hollow actuating rod 64 secured thereto by a cotter pin 65. The lower end of the hollow rod 64 is connected to the upper end of a threaded connecting rod 66 by a cotter pin 67. The piston 52 is adjustably mounted on the rod 66 by a pair of lock nuts 69 and 70 disposed on opposite sides of a connecting portion 71 of the piston 52, which is hollow. The connecting portion 71 is threaded on the connecting rod 66 so that the piston 52 is adjustably supported thereby. If desired, the connecting portion 71 could not be threaded so that the piston 52 would be slidably mounted on the connecting rod 66 so as to be adjustably supported thereby.

Figure 3:
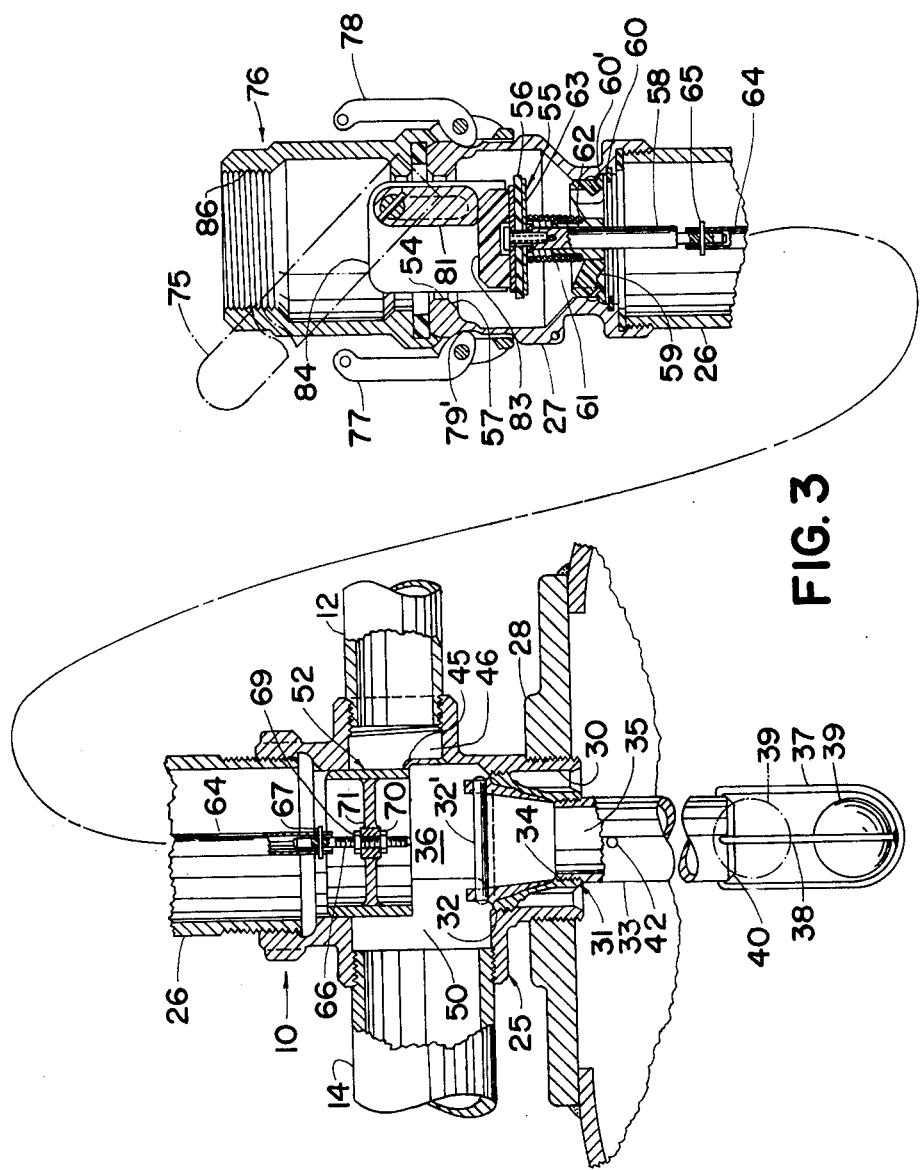
FIG. 3 is a sectional view, similar to FIG. 2, of the improved vapor recovery adapter of the present invention showing the position of the valves in the adapter when the tank is being filled.

Accordingly, whenever the poppet valve 55 is moved downwardly to open the second outlet port 54, the piston 52 also is moved downwardly the same distance. As a result, the piston 52 blocks the aperture 45 to prevent communication of the chamber 36 with the atmosphere through the vent line 12 as shown in FIG. 3.

The poppet valve 55 is moved downwardly whenever a handle 75 of a vapor recovery coupler 76 is actuated in the manner more particularly shown and described in the aforesaid McMath et al patent. The coupler 76 is preferably of the type shown and described in the aforesaid McMath et al patent. Accordingly, the coupler 76 is connected to the body 27 of the vapor recovery adapter 10 by a pair of cam arms 77 and 78 on a housing 79 of the coupler 76 cooperating with a groove 79' in the upper end of the body 27 as more particularly shown and described in the aforesaid McMath et al patent.

The handle 75 is connected externally of the housing 79 to a shaft 80 extending through the housing 79 and supported by a suitable bearing. The shaft 80 has a lift arm 81 mounted thereon and connected thereto by a pin 82.

The arm 81, which rotates with the shaft 80, acts against a pad 83, which is complementary in form to the upper end of the poppet valve 55 to engage therewith. The pad 83 is held by dual plate supports 84 (one shown). Each of the plate supports 84 has a vertical longitudinal slot 85 therein to receive the shaft 80 so that the plate supports 84 are mounted on each side of the arm 81. The end of the housing 79 is internally threaded at 86 to cooperatively receive the threaded end of a hose 87, which is connected to the tank truck 41.

When the handle 75 is rotated, the shaft 80 and the arm 81 rotate therewith. The rotation of the arm 81 by the handle 75 rotating 90° from the position of FIG. 2 to the position of FIG. 3 moves the pad 83 downwardly to its full extent, and the end of the arm 81 holds the pad 83 in the full downward position of FIG. 3. This movement of the pad 83 by the arm 81 causes the poppet valve 55 to be urged downwardly against the force of the spring 61 to move the poppet valve 55 away from the valve seat 57 to open the second outlet port 54. As a result, this downward movement of the poppet valve 55 also moves the piston 52, which is connected to the poppet valve 55, downwardly to block the aperture 45.

Accordingly, when the second outlet port 54 is opened by rotation of the handle 75 to enable vapor to flow to the tank truck 41 from the tank 11, the tank 15, or any other tank connected to the line 14, the vapor from any of these tanks will flow through the hose 87 to the tank truck 41 rather than to the atmosphere through the line 12 since the aperture 45 is blocked by the piston 52. It should be understood that the second outlet port 54 is opened whenever the tank 11, the tank 15, or any other tank connected to the line 14 is to be filled with gasoline even though all of the tanks are not being filled at that time.

When more than one of the tank 11, the tank 15, and any other tank connected to the line 14 is being filled, each is filled, from the tank truck 41 by a separate line with the tank truck 41 connected to the tank 11 by a line 88 to fill line 89 of the tank 11. However, all of the vapor from any of the tanks is returned to the tank truck 41 through the hose 87.

When the tank 11 becomes filled to a predetermined level, the ball 39 engages the seat 40 to prevent further escape of air and/or vapor through the first inlet port 30 in the main body 25. Of course, bleeding of the pressure within the tank 11 occurs to a slight degree through the bleed opening 42. With this increased pressure within the tank 11 being sensed, the supply of liquid thereto is stopped. Each of the other tanks has the anti-contamination vent valve of the type shown and described in the aforesaid Smallwood patent function in a similar manner.

When all of the tanks being filled have reached the desired levels or flow is stopped thereto, the handle 75 is rotated 90° in the opposite direction to enable the spring 61 to return the poppet valve 55 to its closed position of FIG. 2 in which the second outlet port 54 is blocked by the poppet valve 55. The movement of the poppet valve 55 to its closed position lifts the sliding piston 52 to return it to the position of FIG. 2 in which the aperture 45 provides communication between the chamber 36 and the first outlet port 46. Accordingly, this permits the vent line 12 to again commuanciate with all of the tanks connected to the chamber 36.

Therefore, the vapor recovery adapted 10 of the present invention prevents escape of vapor to the atmosphere from any tank when it is being filled. At the same time, all of the tanks are readily vented to the atmosphere when they are not being filled. There also is no contamination of any the tanks or their common vent line during filling.

It should be understood that the coupler 76 is removed from the upper body 27 whenever there is not be filling of any of the tanks since the coupler 76 is normally carried with the tank truck 41. A dust cover is disposed over the upper end of the upper body 27 at other times.

An advantage of this invention is that it reduces the cost for both preventing contamination between tanks having a common vent line and preventing vapor from escaping to the atmosphere. Another advantage of this invention is that it requires only one manhole for each of the storage tanks insofar as the total number of manholes required for the vapor recovery adapters and the anti-contamination vent valves.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A vapor recovery adapter for use with a plurality of tanks having vapor therein to be removed including a housing mounted on one of the tanks and having a first inlet port communicating with the one tank to receive vapor therefrom, said housing having a second inlet port communicating with at least one other tank to receive vapor therefrom, said housing having a first outlet port in communication with a vent to atmosphere, said housing having a chamber with which said first and second inlet ports and said first outlet port communicate whereby vapor may flow from the tanks through said first and second inlet ports to said first outlet port, said housing having a second outlet port disposed above said first outlet port, and housing having a passage therein, one end of said passage communciating with said chamber and the other end of said passage communicating with said second outlet port, and valve means movable in said housing between a first position in which said valve means blocks said first outlet port and opens said second outlet port without blocking communication of said first inlet port with said chamber and communication of said second inlet port with said chamber and a second position in which said valve means blocks said second outlet port and opens said first outlet port without blocking communication of said first inlet port with said chamber and communication of said second inlet port with said chamber, said valve means being moved to its first position when at least one of the connected tanks is being supplied liquid to expell vapors from any of the connected tanks through said second outlet port, said valve means being moved to its second position when none of the connected tanks is being supplied liquid.

2. The adapter according to claim 1 in which said second inlet port is disposed substantially opposite said first outlet port.

3. The adapter according to claim 2 in which said housing has an aperture smaller than said first outlet port to provide communication between said first outlet port and said chamber and said valve means includes movable means to block said aperture to prevent communication between said chamber and said outlet port.

4. The adapter according to claim 3 in which said second inlet port is larger than said first outlet port.

5. The adapter according to claim 4 in which a float valve is supported by said housing to block said first inlet port when the level of the liquid in the tank to which said housing is connected reaches a predetermined level.

6. The adapter according to claim 3 in which said valve means includes a valve member to block said second outlet port, and means connecting said valve member and said movable means.

7. The adapter according to claim 2 in which said second inlet port is larger than said first outlet port.

8. The adapter according to claim 1 in which a float valve is supported by said housing to block said first inlet port when the level of the liquid in the tank to which said housing is connected reaches a predetermined level.

9. The adapter according to claim 1 in which the area of said second inlet port is at least equal to the area of said first outlet port.

* * * * *